(12) United States Patent
Kumazawa

(10) Patent No.: US 10,693,397 B2
(45) Date of Patent: Jun. 23, 2020

(54) THREE-PHASE BRUSHLESS MOTOR STATE IDENTIFICATION

(71) Applicant: SEMICONDUCTOR COMPONENTS INDUSTRIES, LLC, Phoenix, AZ (US)

(72) Inventor: Fumio Kumazawa, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/185,371

(22) Filed: Nov. 9, 2018

(65) Prior Publication Data

US 2019/0081580 A1 Mar. 14, 2019

Related U.S. Application Data

(63) Continuation of application No. 15/802,081, filed on Nov. 2, 2017, now Pat. No. 10,158,306, which is a continuation of application No. 14/731,530, filed on Jun. 5, 2015, now Pat. No. 9,837,940.

(51) Int. Cl.
*H02P 6/16* (2016.01)
*H02P 6/182* (2016.01)
*H02P 6/22* (2006.01)

(52) U.S. Cl.
CPC ............... *H02P 6/182* (2013.01); *H02P 6/22* (2013.01)

(58) Field of Classification Search
CPC .................................. H02P 6/182; H02P 6/22
USPC ...................................................... 318/400.04
See application file for complete search history.

(56) References Cited

U.S. PATENT DOCUMENTS

| 5,694,010 | A | * | 12/1997 | Oomura | H02P 6/34 318/400.07 |
|---|---|---|---|---|---|
| 2001/0019249 | A1 | | 9/2001 | Kato et al. | |
| 2008/0018279 | A1 | | 1/2008 | Fukamizu et al. | |
| 2008/0252242 | A1 | | 10/2008 | Akama et al. | |
| 2011/0090775 | A1 | | 4/2011 | Miyagoe et al. | |
| 2013/0207580 | A1 | * | 8/2013 | Uang | H02P 6/21 318/400.06 |
| 2014/0117889 | A1 | * | 5/2014 | Fujimura | H02P 6/18 318/139 |
| 2014/0321001 | A1 | | 10/2014 | Yoshiya | |
| 2015/0236629 | A1 | * | 8/2015 | Asukai | H02P 6/182 318/400.06 |

FOREIGN PATENT DOCUMENTS

| JP | 2005-287223 A | 10/2005 |
|---|---|---|
| JP | 2013-081369 A | 5/2013 |

* cited by examiner

*Primary Examiner* — Erick D Glass
(74) *Attorney, Agent, or Firm* — Adam R. Stephenson, Ltd.

(57) ABSTRACT

A method for determining the state of a brushless motor having first, second and third phases, in some embodiments, comprises: decoupling said motor from a power source; determining whether said motor is rotating or non-rotating; if the motor is rotating, determining a first phase voltage state relative to a common voltage and a second phase voltage state relative to the common voltage, said first phase and second phase voltage states determined when a third phase voltage is within a predetermined range of said common voltage; and if the first phase voltage state and the second phase voltage state are the same, repeating said determination as to whether the motor is rotating or non-rotating.

19 Claims, 7 Drawing Sheets

| | 302 | 304 | 306 | 308 |
|---|---|---|---|---|
| | U PHASE ZERO CROSS | V PHASE COMPARATOR | W PHASE COMPARATOR | THIS TIME |
| 310 | RISING | L | L | ABNORMAL STATE |
| 312 | RISING | L | H | POSITIVE ROTATION |
| 314 | RISING | H | L | REVERSE ROTATION |
| 316 | RISING | H | H | ABNORMAL STATE |
| 318 | FALLING | L | L | ABNORMAL STATE |
| 320 | FALLING | L | H | REVERSE ROTATION |
| 322 | FALLING | H | L | POSITIVE ROTATION |
| 324 | FALLING | H | H | ABNORMAL STATE |

THREE-PHASE BRUSHLESS MOTOR STATE IDENTIFICATION

CROSS REFERENCE TO RELATED APPLICATIONS

The present application is a continuation of U.S. patent application Ser. No. 15/802,081 to Fumio Kumazawa entitled "Three-Phase Brushless Motor State Identification," filed Nov. 2, 2017, which application is a continuation of the U.S. patent application Ser. No. 14/731,530 to Fumio Kumazawa entitled "Three-Phase Brushless Motor State Identification" now U.S. Pat. No. 9,837,940 issued Dec. 5, 2017, the disclosures of each of which are hereby incorporated entirely herein by reference.

BACKGROUND

Three-phase brushless motors are used in a wide variety of applications. In order to drive such motors in a stable manner at all times, it is necessary to be able to accurately determine the state of the motor—that is, whether the motor is stopped or rotating, and, if rotating, whether it is rotating in a positive or reverse direction. Some techniques for determining the motor state are known, but these techniques often produce inaccurate results because they fail to account for various external influences, such as noise. The consequences of such inaccurate determination of motor state can be severe, including slow motor startup and overheating resulting in significant motor damage. Thus, techniques for more accurately identifying motor state are desired.

SUMMARY

At least some embodiments are directed to a method for determining the state of a brushless motor having first, second and third phases, comprising: decoupling said motor from a power source; determining whether said motor is rotating or non-rotating; if the motor is rotating, determining a first phase voltage state relative to a common voltage and a second phase voltage state relative to the common voltage, said first phase and second phase voltage states determined when a third phase voltage is within a predetermined range of said common voltage; and if the first phase voltage state and the second phase voltage state are the same, repeating said determination as to whether the motor is rotating or non-rotating. Some or all of these embodiments may be supplemented using one or more of the following concepts, in any order and in any combination: further comprising if the first phase voltage state and the second phase voltage state are the same, repeating said determination of the first phase and second phase voltage states; wherein said determination of the first phase and second phase voltage states is repeated no more than a predetermined number of times; wherein, if said determination of the first phase and second phase voltage states is repeated said predetermined number of times, determining that the state of said motor is non-rotating; further comprising if the first phase voltage state is low and the second phase voltage state is high, and if said first and second phase voltage states are determined at a time when the third phase voltage is rising, then determining that the state of said motor is positive rotation; further comprising if the first phase voltage state is high and the second phase voltage state is low, and if said first and second phase voltage states are determined at a time when the third phase voltage is rising, then determining that the state of said motor is reverse rotation; further comprising if the first phase voltage state is low and the second phase voltage state is high, and if said first and second phase voltage states are determined at a time when the third phase voltage is falling, then determining that the state of said motor is reverse rotation; further comprising if the first phase voltage state is high and the second phase voltage state is low, and if said first and second phase voltage states are determined at a time when the third phase voltage is falling, then determining that the state of said motor is positive rotation; wherein determining whether the motor is rotating or non-rotating comprises: providing two comparators, each of said comparators receiving the same phase voltage and each of said comparators receiving a differently biased version of the common voltage; if both outputs of said two comparators are the same polarity, determining that the state of said motor is rotating.

At least some embodiments are directed to a method for determining the state of a brushless motor having first, second and third phases, comprising: determining whether said motor is rotating or non-rotating; if the motor is rotating, determining a first phase voltage state relative to a common voltage and a second phase voltage state relative to the common voltage, said first phase and second phase voltage states determined when a third phase voltage is approximately equal to said common voltage; and if the first phase voltage state and the second phase voltage state are the same, repeating said determination of the first phase voltage state and the second phase voltage state. Some or all of these embodiments may be supplemented using one or more of the following concepts, in any order and in any combination: further comprising disconnecting the motor from a power source prior to performing said determination steps; wherein, if said determination of the first phase and second phase voltage states has been repeated a predetermined number of times, determining that said state of the motor is non-rotating; wherein, if the first phase voltage state and the second phase voltage state are the same, omitting repetition of said determination as to whether the motor is rotating or non-rotating; further comprising if the first phase voltage state is low and the second phase voltage state is high, and if said first and second phase voltage states are determined when the third phase voltage is rising, then determining that the state of said motor is positive rotation; further comprising if the first phase voltage state is high and the second phase voltage state is low, and if said first and second phase voltage states are determined when the third phase voltage is rising, then determining that the state of said motor is reverse rotation; further comprising if the first phase voltage state is low and the second phase voltage state is high, and if said first and second phase voltage states are determined when the third phase voltage is falling, then determining that the state of said motor is reverse rotation; further comprising if the first phase voltage state is high and the second phase voltage state is low, and if said first and second phase voltage states are determined when the third phase voltage is falling, then determining that the state of said motor is positive rotation; wherein determining whether the motor is rotating or non-rotating comprises: providing two comparators, each of said comparators receiving the same phase voltage and each of said comparators receiving a differently biased version of the common voltage; if both outputs of said two comparators are the same polarity, determining that the state of said motor is rotating.

At least some embodiments are directed to a system for determining the state of a motor, comprising: a motor that is associated with first, second and third phases and that is driven by a motor driving circuit; a control circuit that couples to and controls the motor driving circuit; a first comparator that receives a first biased version of a common voltage at one input and a first phase voltage, a second phase voltage, or a third phase voltage at another input, an output of said first comparator provided to the control circuit; and a second comparator that receives a second biased version of the common voltage at one input and the first phase voltage, the second phase voltage, or the third phase voltage at another input, an output of said second comparator provided to the control circuit; wherein, if the outputs of the first and second comparators are both positive or are both negative, the control circuit determines that the motor is rotating, wherein, if the motor is determined to be rotating, the control circuit determines a first phase voltage state relative to the common voltage and a second phase voltage state relative to the common voltage, said first phase and second phase voltage states determined when a third phase voltage is approximately equal to said common voltage, and wherein, if the first phase voltage state and the second phase voltage state are the same, the control circuit repeats said determination of the first phase voltage state and the second phase voltage state. Some or all of these embodiments may be supplemented using one or more of the following concepts, in any order and in any combination: wherein, if the first phase and second phase voltage states are the same, the control circuit repeats said determination of whether said motor is rotating; wherein first and second bias voltages associated with said first and second biased versions of the common voltage have opposing polarities and have absolute values that are less than: an absolute value of a maximum first phase voltage; an absolute value of a maximum second phase voltage; and an absolute value of a maximum third phase voltage.

BRIEF DESCRIPTION OF THE DRAWINGS

There are disclosed in the drawings and in the following description techniques for identifying the state of a three-phase, brushless motor. In the drawings.

Figures 1, 3:
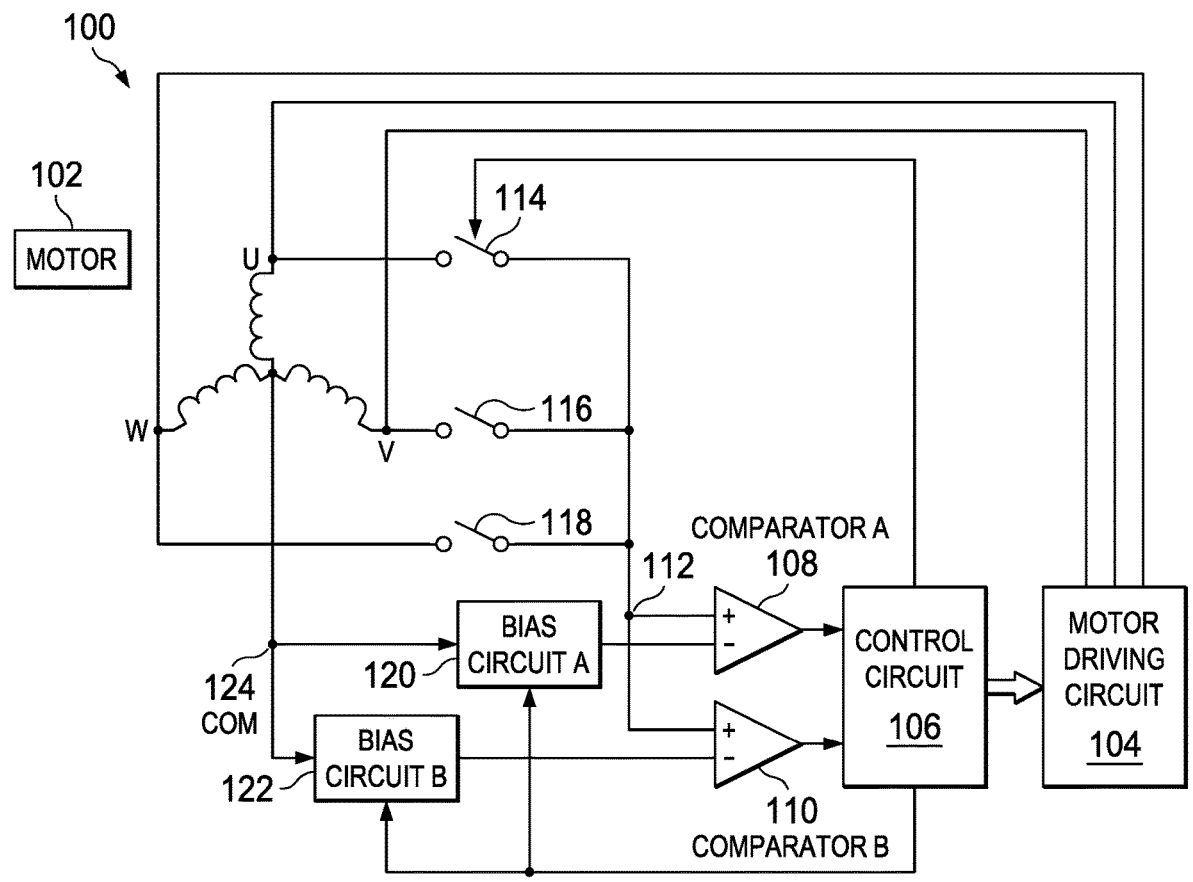
FIG. 1 is a block diagram of a motor state identification circuit.
FIG. 3 is a table describing the manner in which three-phase voltage signals are interpreted.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is a technique for determining the rotational state of a three-phase, brushless motor. The technique generally involves the use of a circuit, described below, that first determines whether the motor in question is rotating or non-rotating. If the motor is determined to be rotating, the technique involves determining the direction in which the motor is rotating—that is, either a positive rotation or a reverse rotation. The direction of rotation is determined by identifying the voltage polarities of two of the three phases when the voltage of the third phase is approximately equal to a common voltage (e.g., a mid-potential voltage). If, at the time that the third phase voltage is approximately equal to the common voltage, the voltage states of the first and second phases are the same (i.e., both HIGH or both LOW), the motor is determined to be in an abnormal state. Because this abnormal state may be caused by noise that may later resolve, the technique described above is repeated, beginning either with the determination of whether the motor is rotating, or with the determination of whether the motor is rotating in a positive or reverse direction. If no abnormal result is produced, the motor is identified as being either in a positive or reverse rotation. However, if an abnormal result is produced again, the technique described above is repeated again, and the process continues to repeat until either the abnormal result no longer occurs or until a predetermined number of repetitions have occurred, at which point the motor is said to be non-rotating, and the technique is complete.

FIG. 1 is a block diagram of a motor state identification circuit 100. The circuit 100 includes a motor 102. The motor 102 is a three-phase, brushless motor. The phases are labeled as U, V, and W, in accordance with convention. The circuit 100 also includes a motor driving circuit 104 that provides power to the motor 102 in three phases. The circuit 100 further includes a control circuit 106, which controls the motor driving circuit 104. Two comparators 108, 110 provide their outputs to the control circuit 106. Each of the comparators 108, 110 has an inverting input and a non-inverting input. The non-inverting inputs are coupled to each other at a common node 112 so that the signal provided to one of the non-inverting inputs is also provided to the other non-inverting input. The common node 112 couples to three switches 114, 116, 118, each of which, in turn, couples to a different phase U, V, or W.

The inverting input of the comparator 108 couples to a bias circuit 120, while the inverting input of the comparator 110 couples to a bias circuit 122. Each of the bias circuits 120, 122 is controlled by the control circuit 106. Each of the bias circuits 120, 122 adds a different voltage bias to the common voltage (mid-potential voltage) associated with the three-phase motor 102. The common voltage is present at node 124 and may be referred to as "COM" in shorthand. In this way, the bias circuit 120 provides a biased version of the COM voltage to the comparator 108, and the bias circuit 122 provides a biased version of the COM voltage to the comparator 110. The degree of bias may be set by an operator of the circuit 100 as may be appropriate and desirable, but in at least some embodiments, the absolute values of the bias voltages applied at circuits 120, 122 are less than the absolute values of the maximum voltages produced at the U, V and W phases. Further, in at least some embodiments, the bias voltages have opposing polarity, meaning that the voltage output by the bias circuit 120 is slightly greater than the COM voltage while the bias circuit 122 produces a voltage that is slightly lesser than the COM voltage; alternatively, the bias circuit 120 produces a voltage that is slightly lesser than the COM voltage while the bias circuit 122 produces a voltage that is slightly greater than the COM voltage. Although the precise bias applied at the circuits 120, 122 may vary, in at least some embodiments, the bias voltages applied may be on the order of tens of millivolts. The scope of disclosure is not limited to any particular magnitude of bias, however, and any and all suitable bias voltages are contemplated.

Figure 2A:
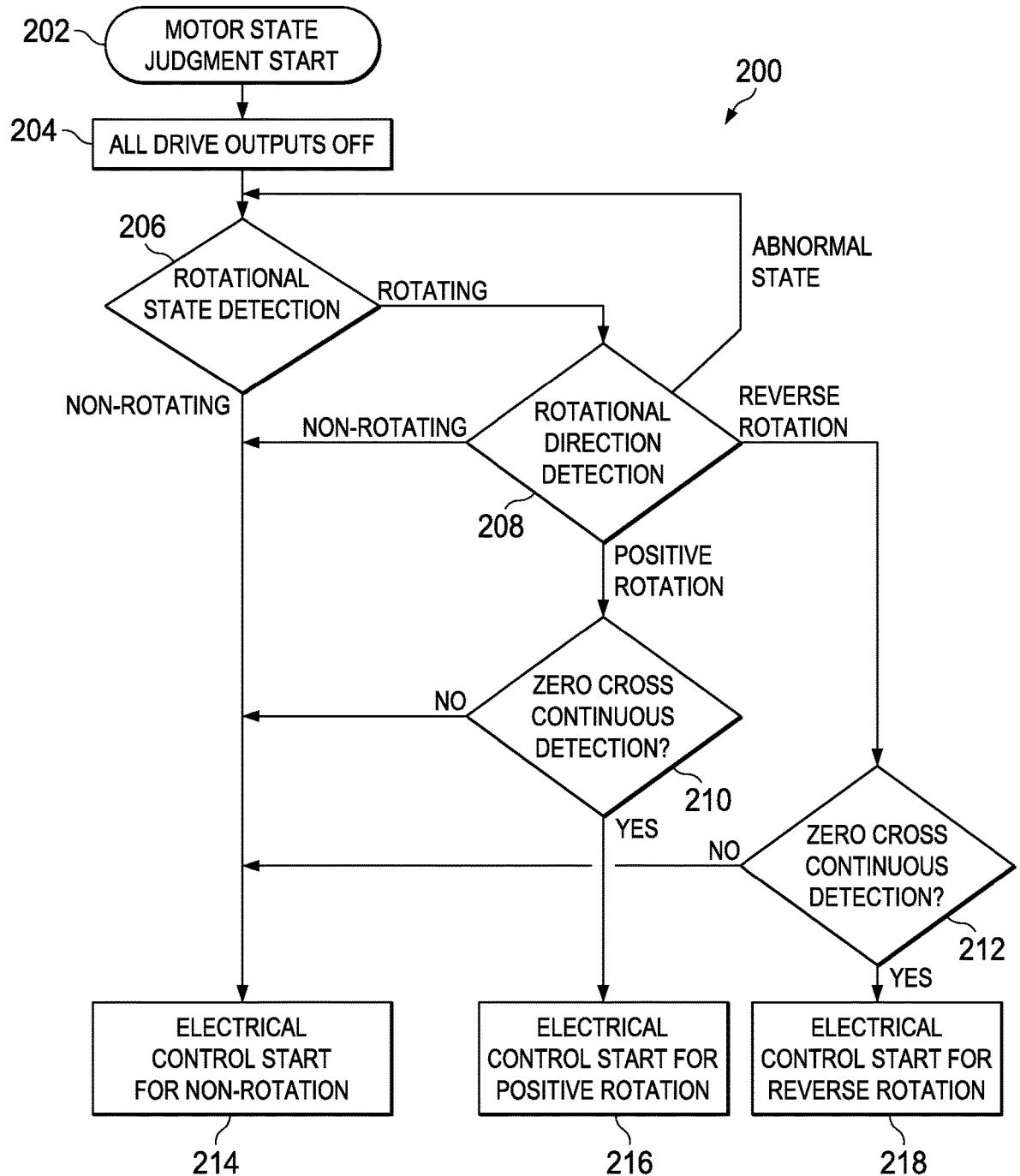
FIG. 2A is a flow diagram of a method for identifying motor state.
Figure 2B:
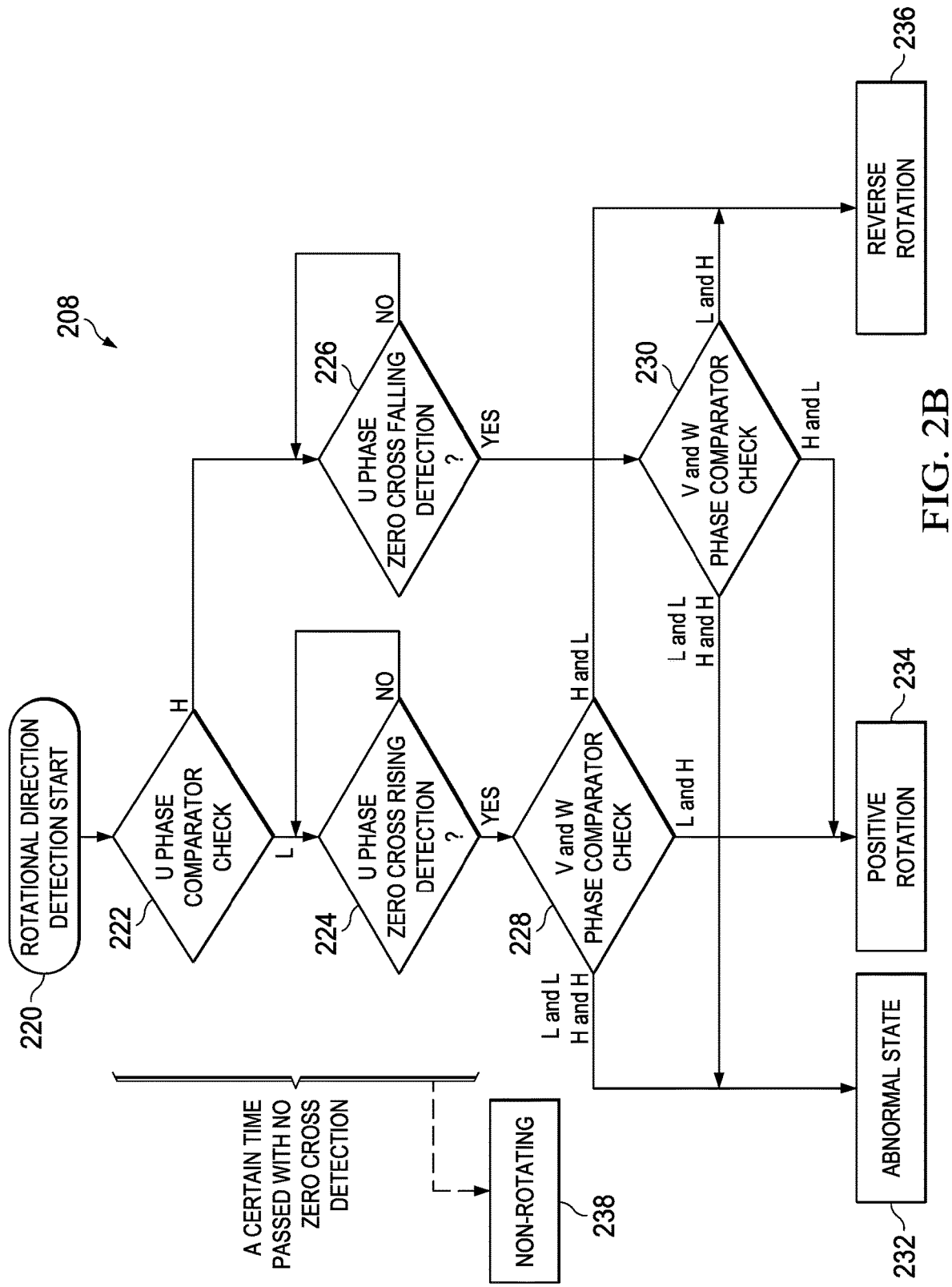
FIG. 2B is a flow diagram of a sub-method of the method depicted in FIG. 2A.

The operation of the circuit 100 is best described with respect to the flow diagrams provided in FIGS. 2A and 2B. In at least some embodiments, the control circuit 106 performs some or all steps of the methods described in FIGS. 2A and 2B, but the scope of disclosure is not limited as such. The method 200 of FIG. 2A begins at step 202. At step 204, all drive outputs are shut off, meaning that the motor driving circuit 104 ceases to provide power to the motor 102. The motor is still rotating, however, and the direction of this rotation is that which must be determined. To this end, the method 200 comprises determining the rotational state of the motor (step 206). The control circuit 106 determines whether the motor 102 is rotating or not by comparing each of the U, V and W phase voltages (inductive voltages) to the biased voltages produced by circuits 120, 122. If each such comparison produces a negative value and a positive value, the motor 102 is non-rotating (i.e., stopped). In that case, the method 200 comprises concluding that the motor 102 is non-rotating (step 206) and applying electrical controls to the motor 102 appropriate for a non-rotating state (step 214). However, if any such comparison produces two negative values or two positive values, the motor 102 is determined to be rotating, and the method 200 proceeds to step 208.

For example, assume that the motor 102 is non-rotating. Thus, the phase voltages at U, V and W (and COM) are all the same—for instance, 0.0 V. Further assume that switch 114 is closed and switches 116, 118 are open. The comparator 108 will compare the 0.0 V from the U phase to the biased voltage produced by bias circuit 120. Assuming a bias voltage here of +10.0 mV, the output from the comparator 108 will be 0.0 mV−10.0 mV=−10.0 mV. In other words, the output of the comparator 108 will be negative. Similarly, the comparator 110 will compare the 0.0 V from the U phase to the biased voltage produced by the bias circuit 122. Assuming a bias voltage here of −10.0 mV, the output from the comparator 110 will be 0.0 mV−−10.0 mV=+10.0 mV. In other words, the output of the comparator 110 will be positive. The process will be repeated for the V and W phase voltages, with the same polarities produced at the outputs of the comparators 108, 110. Because opposing polarities are produced at the outputs of the comparators for each of the U, V and W phase voltages, the motor 102 is determined to be non-rotating. If, however, a single one of the comparisons has produced two positives or two negatives, the motor 102 would be determined to be rotating. For instance, had the motor been rotating, the U, V and W phase voltages may have been such that the outputs of the comparators 108, 110 would be negative and positive for the U phase voltage, negative and positive for the V phase voltage, and positive and positive for the W phase voltage, signifying that the motor 102 is rotating.

Referring still to FIG. 2A, and assuming that the motor 102 is determined to be rotational at step 206, the method 200 comprises determining the direction of the motor rotation (step 208). FIG. 2B contains a flow chart of step (or method) 208 describing how this direction is determined. Method 208 begins at step 220. At step 222, either of the comparators 108, 110—for purposes of discussion, only comparator 108 will be referenced, but comparator 110 would also be suitable—is used to determine the state of the U phase voltage in relation to the COM voltage (or, in some embodiments, in relation to the COM voltage plus or minus a small bias voltage, which should be set at a negligible value for purposes of determining rotation direction). If the U phase voltage is determined to be greater than the COM voltage, the U phase voltage state is said to be HIGH, while if the U phase voltage is determined to be less than the COM voltage, the U phase voltage state is said to be LOW. Accordingly, the method 208 comprises making this determination. If the U phase voltage state is determined to be LOW, the method 208 comprises waiting until the U phase voltage is approximately equal to the COM voltage as the U phase voltage rises (step 224). (Bearing in mind that the voltages applied to the three phase motor 102 are sinusoidal, the U, V and W phase voltages rise and fall regularly.) Once the U phase voltage is approximately equal to the COM voltage (i.e., within a predetermined range of 5% of the COM voltage), the method 208 comprises determining the V and W phase voltage states relative to the COM voltage (step 228). (If the step 224 is not completed within a predetermined amount of time, the method 208 comprises determining that the motor 102 is non-rotating (step 238).) If the V and W phase voltage states are both LOW, or if they are both HIGH, the method 208 includes determining that the motor 102 is in an abnormal state (step 232). If, however, at step 228 it is determined that the V phase voltage state is LOW and the W phase voltage state is HIGH, the method 208 concludes that the motor 102 is in positive rotation (step 234). Alternatively, if it is determined that the V phase voltage state is HIGH and the W phase voltage state is LOW, the method 208 concludes that the motor 102 is in reverse rotation (step 236).

Referring again to step 222, if the U phase voltage state is determined to be HIGH, the method 208 includes waiting until the U phase voltage is approximately equal to the COM voltage as the U phase voltage is falling (step 226). Once this occurs, the method 208 comprises determining the V and W phase voltage states, as described above with respect to step 228 (step 230). If the V and W phase voltage states are the same (i.e., both HIGH or both LOW), the method 208 comprises concluding that the motor 102 is in an abnormal state (step 232). If the V phase voltage state is HIGH and the W phase voltage state is LOW, the method 208 comprises concluding that the motor 102 is in positive rotation (step 234). If the V phase voltage state is LOW and the W phase voltage state is HIGH, the method 208 comprises concluding that the motor 102 is in reverse rotation (step 236).

FIG. 3 provides a table 300 that summarizes the possible outcomes of steps 224, 226, 228 and 230 in method 208 and lists the conclusions about motor state for each possible permutation of outcomes. The table 300 includes column 302, which describes whether the U phase voltage is rising or falling; column 304, which describes the V phase voltage state; column 306, which describes the W phase voltage state; and column 308, which lists the corresponding conclusion about the state of the motor 102. Each of the rows 310, 312, 314, 316, 318, 320, 322, 324 provides a different permutation of possible outcomes for steps 224, 226, 228 and 230. Thus, for instance, referring to row 310, when the U phase voltage is rising and the V and W phase voltage states are determined to both be LOW when the U phase voltage is equal or at least approximately equal to the COM voltage, the motor 102 is determined to be in an abnormal state. Similarly, referring to row 320, when the U phase voltage is falling and the V and W phase voltage states are determined to be LOW and HIGH, respectively, when the U phase voltage is equal or at least approximately equal to the COM voltage, the motor 102 is determined to be in reverse rotation.

Figure 4:
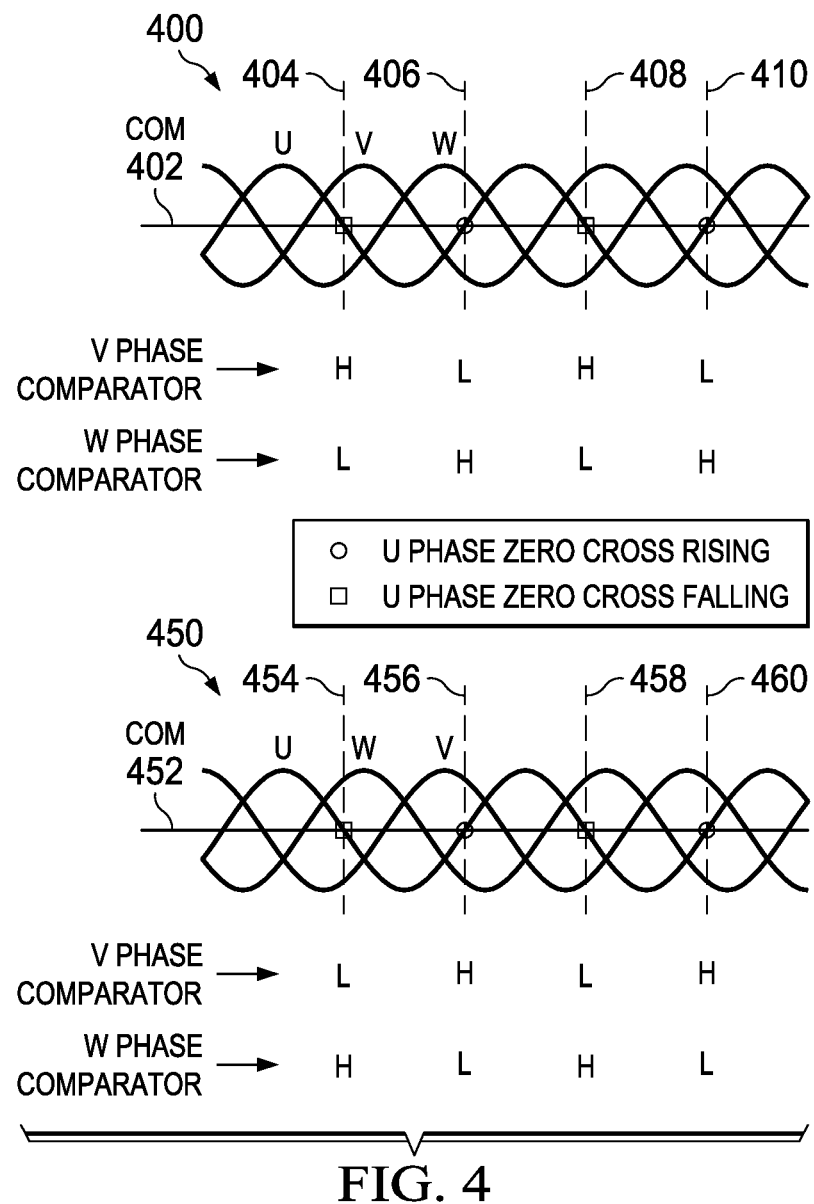
FIG. 4 is a two-part graph of waveforms depicting positive rotation phase voltages and reverse rotation phase voltages.

FIG. 4 shows two graphs 400, 450 that may be helpful in understanding the method 208 of FIG. 2B. The graph 400 shows the COM voltage signal 402 and the U, V, and W phase voltage signals when the motor 102 is in positive rotation. Similarly, the graph 450 shows the COM voltage signal 452 and the U, V and W phase voltage signals when the motor 102 is in reverse rotation. As can be seen in graph 400, as the U phase voltage signal rises and falls, it regularly coincides with the COM signal 402. These points in time when the U phase voltage signal is equal or at least approximately equal to the COM voltage signal are the times when the V and W phase voltage states are determined in method 208, as explained above. Comparing graph 400 with table 300, for instance, the point in time marked by numeral 404 corresponds to row 322; numeral 406 corresponds to row 312; numeral 408 corresponds to row 322, and numeral 410 corresponds to row 312. Both row 312 and row 322 indicate positive rotation, as column 308 of table 300 indicates. Thus, the waveforms in graph 400 indicate positive rotation of the motor 102. Referring to graph 450, at the point in time noted by numeral 454, the U phase voltage signal is falling, while the V and W phase voltage states are LOW and HIGH, respectively. Thus, numeral 454 corresponds to row 320 in table 300, as does numeral 458. Likewise, numerals 456 and 460 correspond to row 314. Both rows 314 and 320 indicate reverse rotation; thus, the graph 450 includes waveforms indicating reverse rotation of the motor 102.

The foregoing discussion of FIGS. 2B, 3 and 4 all pertain to the performance of step 208 in the method 200 of FIG. 2A. The remainder of the method 200 is now described. If, at step 208, it is determined that the motor 102 is in positive rotation, the method 200 comprises determining whether there is zero cross continuous detection (step 210). This means that the system determines the times at which the U, V and W phase voltages intersect with the COM voltage and further determine not only the time intervals between these intersections but also whether each of the phase voltages is rising or falling at the intersections. Thus, for example, referring briefly to graph 400 in FIG. 4, if the system detects that the intersections with the COM voltage follow the pattern of U rising, W falling, V rising, U falling, W rising, V falling, U rising, W falling, etc. as shown, and further if the system detects that these intersections of the phase voltages with the COM voltage follow predetermined timing intervals, then the system determines with greater certainty that the motor is in positive rotation. Similarly, as mentioned with respect to step 212 below, if the system detects intersection behavior (e.g., order and timing) between the phase voltages and the COM voltage as depicted in graph 450, the system determines with greater certainty that the motor is in reverse rotation. If the intersection behavior is unrecognized or at least fails to fall into the patterns depicted in graphs 400 and 450, the motor may not be rotating at all. In some embodiments, each instance of the zero cross continuous detection step depicted in the figures is optional. In some embodiments, the precise order and timing requirements for the system to conclude that the motor is in fact in positive rotation or reverse rotation may be programmably varied as appropriate and desired.

If there is no zero cross continuous detection, the method 200 comprises ultimately concluding that the motor 102 is non-rotating and that it should be treated as such (step 214). Otherwise, the method 200 comprises ultimately concluding that the motor 102 is in positive rotation and that the electrical control start appropriate for positive rotation should be applied to the motor 102 (step 216). If, at step 208, it is determined that the motor 102 is in reverse rotation, the method 200 comprises determining whether there is zero cross continuous detection (step 212), as described above with respect to step 210. If not, the method 200 comprises ultimately concluding that the motor 102 is non-rotating and that it should be treated as such (step 214). Otherwise, the method 200 comprises ultimately concluding that the motor 102 is in reverse rotation and that the electrical control start appropriate for reverse rotation should be applied to the motor 102 (step 218). If at step 208 it is determined that the motor is non-rotating (step 238), it is ultimately concluded that the motor 102 is indeed non-rotating and it is treated as such (step 214). If, at step 208 it is determined that the motor 102 is in an abnormal state (step 232), the method 200 comprises return control of the method to step 206, as shown.

Figure 5:
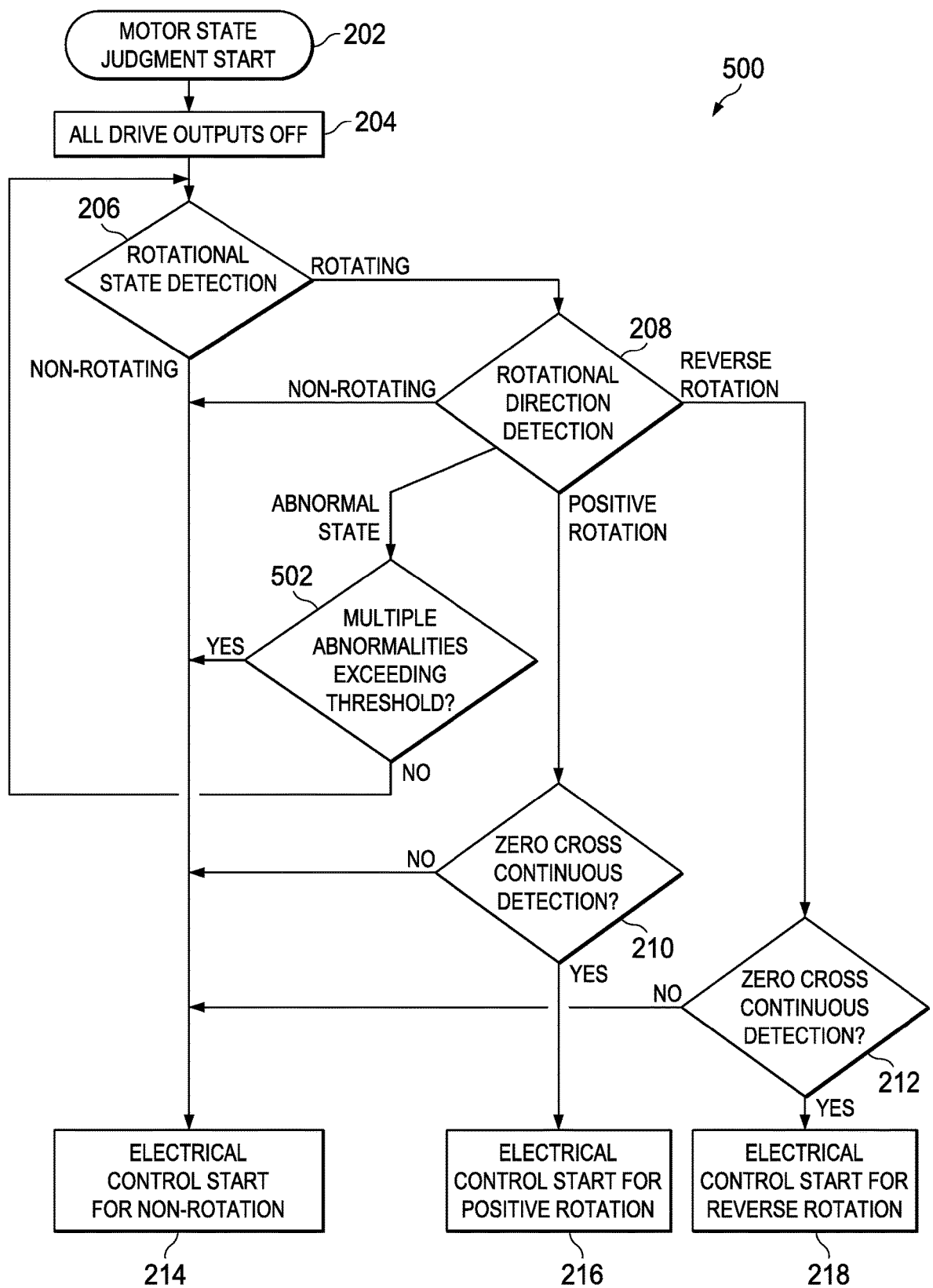
FIG. 5 is a flow diagram of another method for identifying motor state.

FIG. 5 is a flow diagram of another method 500 for identifying motor state. The method 500 is virtually identical to the method 200 of FIG. 2A. The difference is that in method 500, the number of times that the motor 102 is determined to be in an abnormal state at step 208 is counted (step 502). If the count meets or exceeds a predetermined number, the method 500 comprises ultimately concluding that the motor 102 is non-rotating (step 214). Otherwise, if the count does not meet or exceed the predetermined number, the method 500 comprises returning flow of the method 500 to step 206.

Figure 6A:
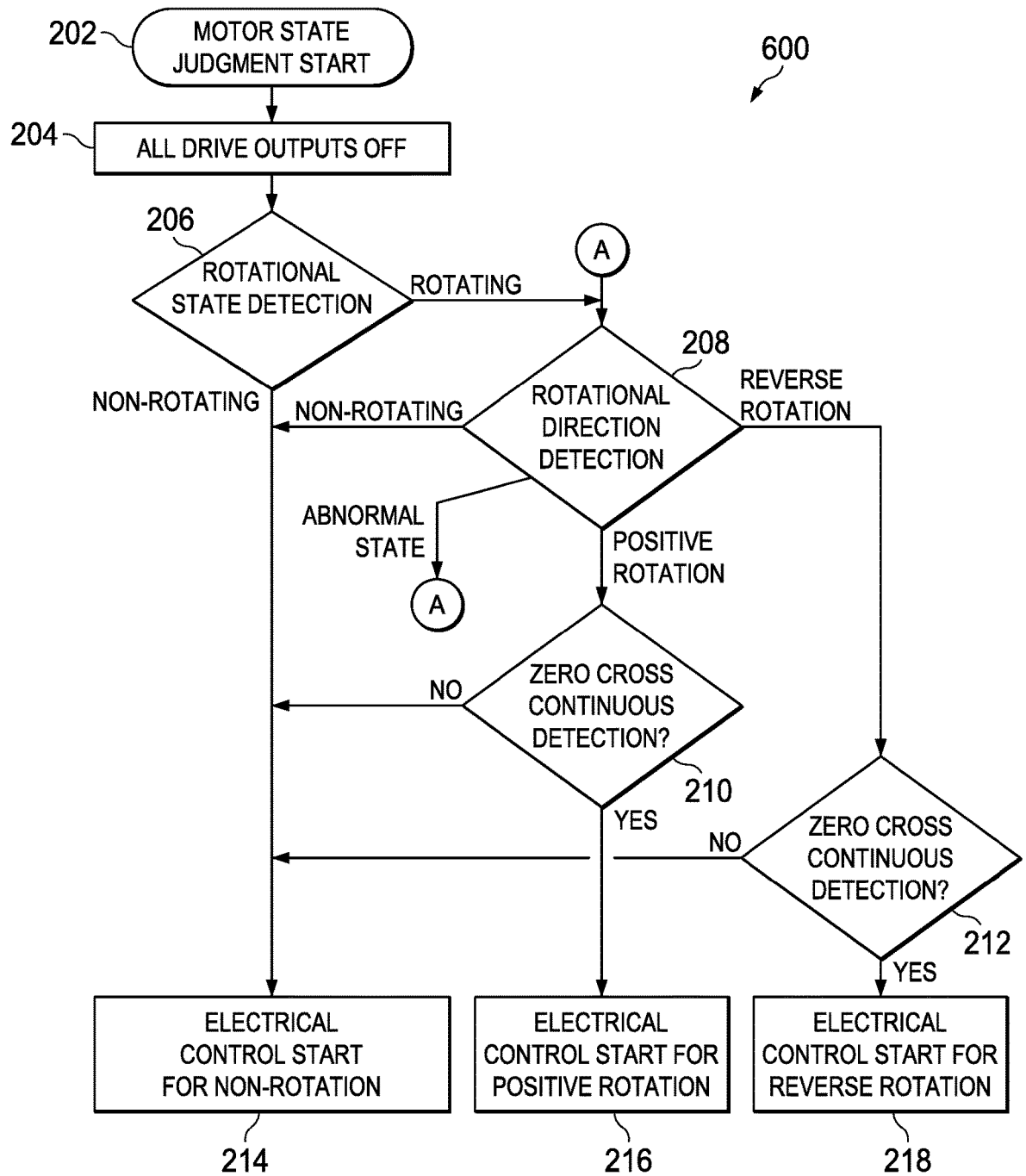
FIG. 6A is a flow diagram of yet another method for identifying motor state.

FIG. 6A is a flow diagram of yet another method 600 for identifying motor state. The method 600 is virtually identical to the method 200 of FIG. 2A. The difference is that in method 600, a finding of abnormal state at step 208 causes control of the method 600 to return to step 208 instead of step 206.

Figure 6B:
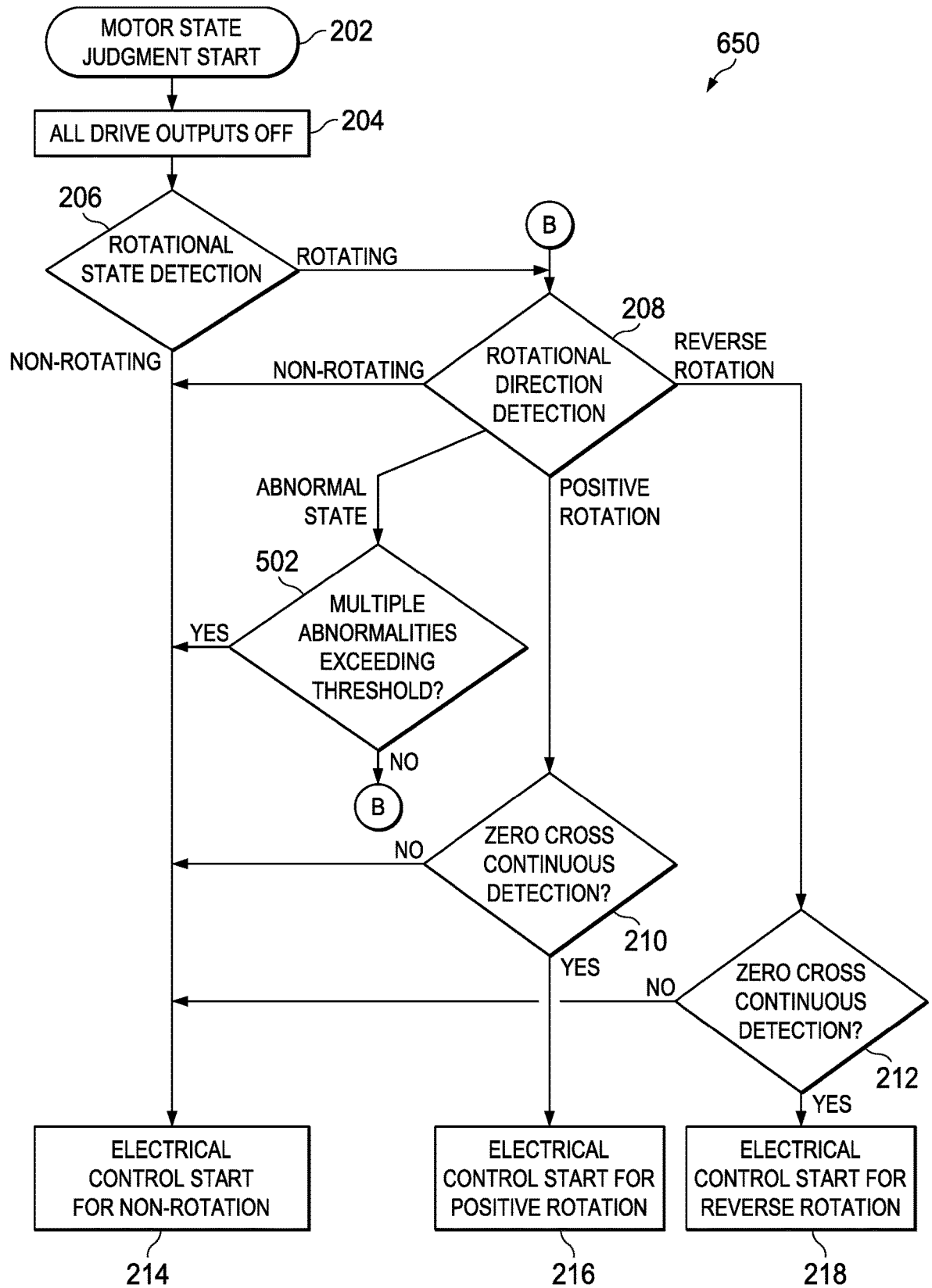
FIG. 6B is a flow diagram of still another method for identifying motor state.

FIG. 6B is a flow diagram of still another method 650 for identifying motor state. The method 650 is virtually identical to the method 500 of FIG. 5. The difference is that in method 650, a determination that the number of times that the motor 102 has been found to be in an abnormal state fails to meet or exceed a predetermined number (step 502) results in control of the method 650 returning to step 208 instead of to step 206.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A system for determining a state of a motor, comprising:
   a motor driving circuit configured to couple to a three phase motor;
   a control circuit coupled to the motor driving circuit;
   a first bias circuit coupled to the control circuit;
   a second bias circuit coupled to the control circuit;
   a first comparator coupled to an output of the first bias circuit; and
   a second comparator coupled to an output of the second bias circuit.

2. The system of claim 1, wherein the first bias circuit and the second bias circuit are configured to receive a common voltage from the three phase motor.

3. The system of claim 2, further comprising:
a first switch configured to couple the first comparator to a first phase based on a first control signal received from the control circuit;
a second switch configured to couple the first comparator to a second phase; and
a third switch configured to couple the first comparator to a third phase.

4. The system of claim 1, wherein the control circuit is configured to determine that the motor is rotating when the output of the first comparator and the output of the second comparator are both positive or are both negative.

5. The system of claim 3, wherein the control circuit is further configured to determine a voltage of the first phase relative to the common voltage when the motor is rotating and a voltage of the third phase is approximately equal to the common voltage.

6. The system of claim 3, wherein the control circuit is further configured to determine a voltage of the second phase relative to the common voltage present when the motor is rotating and a voltage of the third phase is approximately equal to the common voltage.

7. The system of claim 3, wherein the control circuit is further configured to determine a direction of rotation of the motor when the motor is rotating based on a polarity of at least two of a voltage of the first phase, a voltage of the second phase, or a voltage of the third phase when the voltage of the third phase is approximately equal to the common voltage.

8. The system of claim 1, wherein first and second bias voltages associated with the first and second bias circuits have opposing polarities and have absolute values that are less than:
an absolute value of a maximum voltage of a first phase;
an absolute value of a maximum voltage of a second phase; and
an absolute value of a maximum voltage of a third phase.

9. A system for determining a state of a motor comprising:
a control circuit configured to couple with a three-phase motor;
a first bias circuit coupled to the control circuit, the first bias circuit configured to receive a common voltage from the motor;
a second bias circuit coupled to the control circuit, the second bias circuit configured to receive the common voltage from the motor;
a first comparator coupled to an output of the first bias circuit, the first comparator configured to receive a voltage from at least one of a first phase, a second phase, or a third phase of the motor; and
a second comparator coupled to an output of the second bias circuit, the second comparator configured to receive a voltage from at least one of the first phase, the second phase, or the third phase of the motor.

10. The system of claim 9, further comprising a motor driving circuit coupled to the control circuit, wherein the motor driving circuit is configured to couple to the motor to control the motor based on input received from the control circuit.

11. The system of claim 9, wherein a first and a second bias voltage associated with the first and the second bias circuits have opposing polarities and have absolute values that are less than:
an absolute value of a maximum voltage of the first phase of the motor;
an absolute value of a maximum voltage of the second phase of the motor; and
an absolute value of a maximum voltage of the third phase of the motor.

12. The system of claim 9, wherein the first comparator and the second comparator are each selectively coupled at a second input via switches to one of the first phase of the motor, the second phase of the motor, or the third phase of the motor.

13. The system of claim 9, wherein the control circuit is further configured to determine a direction of rotation of the motor when the motor is rotating based on a polarity of at least two of the voltage of the first phase of the motor, the voltage of the second phase of the motor, or the voltage of the third phase of the motor when the third phase of the motor is approximately equal to the common voltage.

14. The system of claim 13, wherein the control circuit is further configured to determine the motor is rotating in a positive direction when one of:
the polarity of the voltage of the first phase of the motor is low, the polarity of the voltage of the second phase of the motor is high, and the third phase voltage is rising; or
the polarity of the voltage of the first phase of the motor is high, the polarity of the voltage of the second phase of the motor is low, and the voltage of the third phase is falling.

15. The system of claim 13, wherein the control circuit is further configured to determine the motor is rotating in a reverse direction when one of:
the polarity of the voltage of the first phase of the motor is high, the polarity of the voltage of the second phase of the motor is low, and the voltage of the third phase is rising; or
the polarity of the voltage of the first phase of the motor is low, the polarity of the voltage of the second phase of the motor is high, and the voltage of the third phase is falling.

16. The system of claim 9, wherein the control circuit is further configured to determine that the motor is non-rotating when the voltage of the first phase of the motor and the voltage of the second phase of the motor are determined to be the same a predetermined number of times.

17. A system, comprising:
a motor driving circuit configured to couple to a motor associated with first, second and third phases;
a control circuit coupled to the motor driving circuit;
a first comparator configured to:
receive a first biased version of a common voltage at one input and one of a first phase voltage, a second phase voltage, or a third phase voltage at another input; and
provide an output of the first comparator to the control circuit; and
a second comparator configured to:
receive a second biased version of the common voltage at one input and one of the first phase voltage, the second phase voltage, or the third phase voltage at another input; and
provide an output of the second comparator to the control circuit,
wherein, the control circuit is further configured to determine whether the motor is rotating based upon the output of the first comparator and the output of the second comparator.

18. The system of claim 17, wherein the control circuit is configured to repeat a determination of whether the motor is rotating when a first phase voltage state and second phase voltage state are the same.

19. The system of claim 17, wherein a first and a second bias voltage associated with the first and the second biased versions of the common voltage have opposing polarities and have absolute values that are less than:
- an absolute value of a maximum first phase voltage;
- an absolute value of a maximum second phase voltage; and
- an absolute value of a maximum third phase voltage.

\* \* \* \* \*